(12) United States Patent
Aswadhati et al.

(10) Patent No.: US 8,935,463 B1
(45) Date of Patent: Jan. 13, 2015

(54) COMPUTE ENGINE IN A SMART SSD EXPLOITING LOCALITY OF DATA

(71) Applicant: Fastor Systems, Inc., Santa Clara, CA (US)

(72) Inventors: Ajoy Aswadhati, Cupertino, CA (US); Vijay Aswadhati, San Ramon, CA (US)

(73) Assignee: Fastor Systems, Inc., Santa Clara, CA (US)

( * ) Notice: Subject to any disclaimer, the term of this patent is extended or adjusted under 35 U.S.C. 154(b) by 0 days.

(21) Appl. No.: 14/147,462

(22) Filed: Jan. 3, 2014

(51) Int. Cl.
*G06F 13/00* (2006.01)
*G06F 12/02* (2006.01)

(52) U.S. Cl.
CPC .................. *G06F 12/0246* (2013.01)
USPC ........................................................ 711/103

(58) Field of Classification Search
CPC ...... G06F 3/0679; G06F 11/068; G06F 13/00
See application file for complete search history.

(56) References Cited

U.S. PATENT DOCUMENTS

| | | | |
|---|---|---|---|
| 5,586,285 A * | 12/1996 | Hasbun et al. ................. | 711/103 |
| 2006/0212645 A1 * | 9/2006 | Petersen et al. ................ | 711/103 |
| 2007/0055831 A1 * | 3/2007 | Beeston et al. ................ | 711/154 |
| 2009/0132736 A1 * | 5/2009 | Hasan et al. .................... | 710/56 |
| 2011/0055471 A1 * | 3/2011 | Thatcher et al. ............... | 711/114 |
| 2012/0260021 A1 * | 10/2012 | Rudelic ......................... | 711/103 |
| 2013/0067151 A1 * | 3/2013 | Lasser et al. .................. | 711/103 |
| 2013/0080692 A1 * | 3/2013 | Feinberg et al. ............... | 711/103 |
| 2013/0289756 A1 * | 10/2013 | Resch et al. .................... | 700/94 |

* cited by examiner

*Primary Examiner* — Sean D Rossiter
(74) *Attorney, Agent, or Firm* — Maryam Imam; IPxLAW Group LLP

(57) ABSTRACT

An embodiment of the invention includes a storage subsystem having a storage central processing unit (SCPU) operable to receive and send a command to a host, the command requiring data computation, a compute engine coupled to the SCPU, and a bank of memory devices coupled to the SCPU and the compute engine and configured to store data required by the commands, wherein the SCPU or the compute engine are operable to perform computation of the data.

54 Claims, 2 Drawing Sheets

COMPUTE ENGINE IN A SMART SSD EXPLOITING LOCALITY OF DATA

BACKGROUND

Various embodiment of the invention relate generally to solid state disks (SSDs) and particularly to smart SSDs.

Solid State Disks (SSDs) have shown promise in cloud storage and other types of large storage applications. An entire standard, used by SSDs, i.e. PCI Express (PCIe), has been developed.

Currently, SSDs are nearly dumb storage devices with no capability of complex data manipulation, which is essentially done by external processors or microcontrollers. The act of retrieving and/or storing data in the SSDs causes a wait time before computation can be started. As can be appreciated, system performance is an essential advantage in large-scale storage applications servicing many users.

For example, current server architectures perform computation of data that is stored in a storage medium. Performing this computation entails moving data to and from main memory of the processor, such as a central processing unit (CPU), and the storage subsystem. Moving the data hinders system performance.

Therefore, the need arises to remove the above bottleneck for high-performance applications using SSDs.

SUMMARY

Briefly, an embodiment of the invention includes a storage subsystem having a storage central processing unit (SCPU) operable to receive and send a command to a host, the command requiring data computation, a compute engine coupled to the SCPU, and a bank of memory devices coupled to the SCPU and the compute engine and configured to store data required by the commands, wherein the SCPU or the compute engine are operable to perform computation of the data.

A further understanding of the nature and the advantages of particular embodiments disclosed herein may be realized by reference of the remaining portions of the specification and the attached drawings.

DETAILED DESCRIPTION OF EMBODIMENTS

Figure 1:
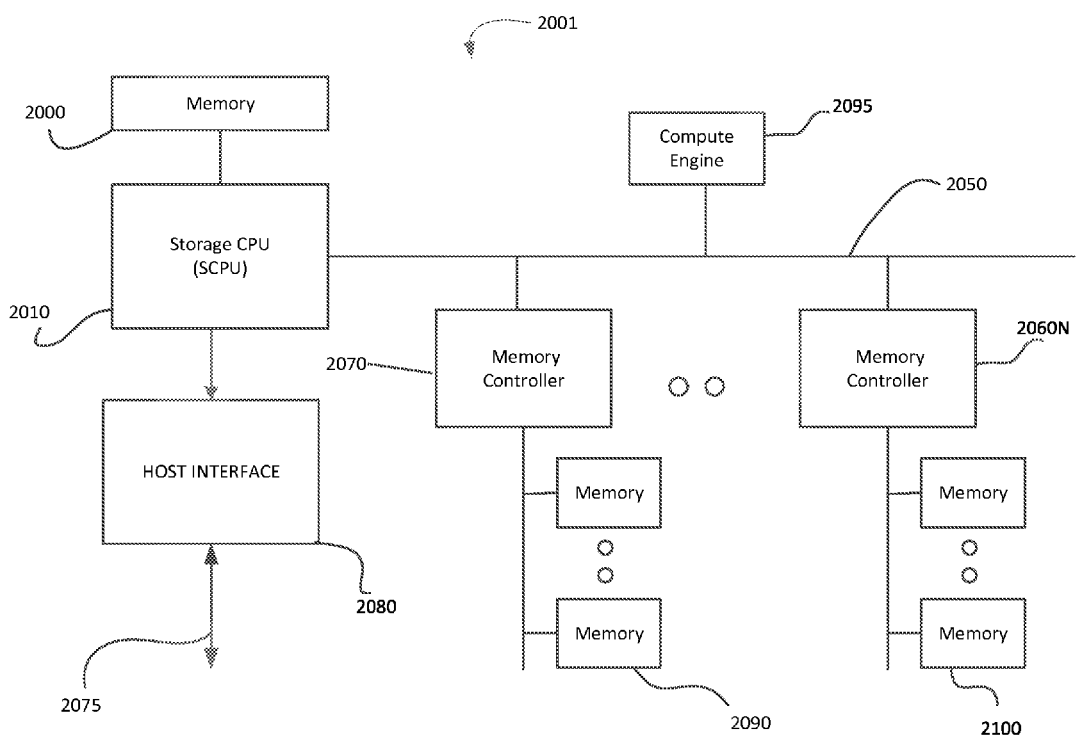
FIG. 1 shows a storage subsystem, in accordance with an embodiment of the invention.

Referring now to FIG. 1, a storage subsystem 2001 is shown, in accordance with an embodiment of the invention. The storage subsystem 2001 is shown to include memory 2000, storage central processing unit (SCPU) 2010, host interface 2080, a bank of memory controllers 2070-2060N, a bank of memory devices 2090, an interface 2050, compute engine 2095, a host interface bus 2075, and a bank of memory devices 2100.

In some embodiments, each of the memory devices 2090 and 2100 is made of volatile memory or a combination of volatile and non-volatile memory.

The SCPU 2010 is shown coupled to the memory 2000 and the host interface 2080. The SCPU 2010 is further shown to be in communication with the memory controllers 2070-2060N and the compute engine 2095 through the interface 2050. Similarly, the compute engine 2095 and the memory controllers 2070-2060N are in communication with each other through the interface 2050. The host interface 2080 is in communication with a host (not shown) through the host interface bus 2075. The memory controller 2070 is shown coupled to the bank of memory devices 2090 and the memory controller 2060N is shown coupled to the bank of memories 2100. While not shown, there is typically more than two memory controllers and associated bank of memories than that which is shown in FIG. 1. In some embodiments, the bank of memory devices 2090 and 2100 are non-volatile memory. Advantageously, the storage subsystem 2001 comprises a SSD and the compute engine 2095 is embedded in the SSD. The storage subsystem 2001 need not be a SSD and in some embodiments, it is other types of systems or sub-systems, such as without limitation, servers. The storage subsystem 2001 is not intended to be limited to a subsystem. For example, viewing the subsystem 2001 as a subsystem, it is an independent entity that is used by a system. In the case where the storage subsystem 2001 is viewed as a system, the subsystem 2001 is not used by another system and is rather plugged into the device it is designed for, such as a computer.

In exemplary embodiments of the invention, the interface 2050 is a processor local bus, such as without limitation, a PCI Express (PCIe) bus or a processor interconnect bus, such as a hypertransport, or QuickPath Interconnect (QPI). In exemplary embodiments of the invention, the host interface bus 2075 is PCIe, Ethernet, fiber channel, infiniband, or Serial ATA (SATA).

The storage subsystem 2001 performs computing by being closest to the data since the data is saved in the bank of memory devices 2090 and 2100. Only the interface 2050 separates the compute engine 2095 from the data. Accordingly, the storage subsystem 2001 exploits the close locality of data.

In operation, the host interface 2080 receives or sends commands from and to a host through the host interface bus 2075. Alternatively, events are received or sent by the host interface 2080 to a host through the host interface bus 2075. The host interface 2080 transmits received host commands to the SCPU 2010 for processing. The SCPU 2010 uses the memory 2000 for temporary storage. For example, data associated with a host command may be stored in the memory 2000. Upon processing the host command, the SCPU 2010 instructs the compute engine 2095 and the memory controllers 2070-2060N accordingly. For instance, an application that is being executed by the host may require computations such as fast fourier transform (FFT) or search of the data, the data being either stored in the storage subsystem 2001 or being transmitted thereto. The compute engine 2095, under the direction of the SCPU 2010, performs such computation. The memory controller 2070, under the direction the SCPU 2010, stores or retrieves data to and from the bank of memory devices 2090 to which it is coupled. Similarly, the memory controller 2060N stores and/or retrieves data to and from the bank of memory devices 2100 to which it is coupled. Alternatively, the SCPU 2010, instead of the compute engine 2095, performs computations. In this manner and advantageously, compute functions as well as data storage are all done by the storage subsystem 2001 without the need for data movement to and from the host, which frees the host to tend to other matters thereby improving system performance. In other words, the host is offloaded. Reduction in system power as data is not moved from volatile memory across many interfaces to the host memory. Accordingly, the step(s) of having to move the data from the host to storage, i.e. the bank of memory devices 2090 and 2100, is avoided. This results in power saving. Furthermore, the storage subsystem 2001 causes lower latency compared to prior art systems because data movement across multiple interfaces is avoided. Data movement is merely across one interface, the interface 2050.

Figure 2:
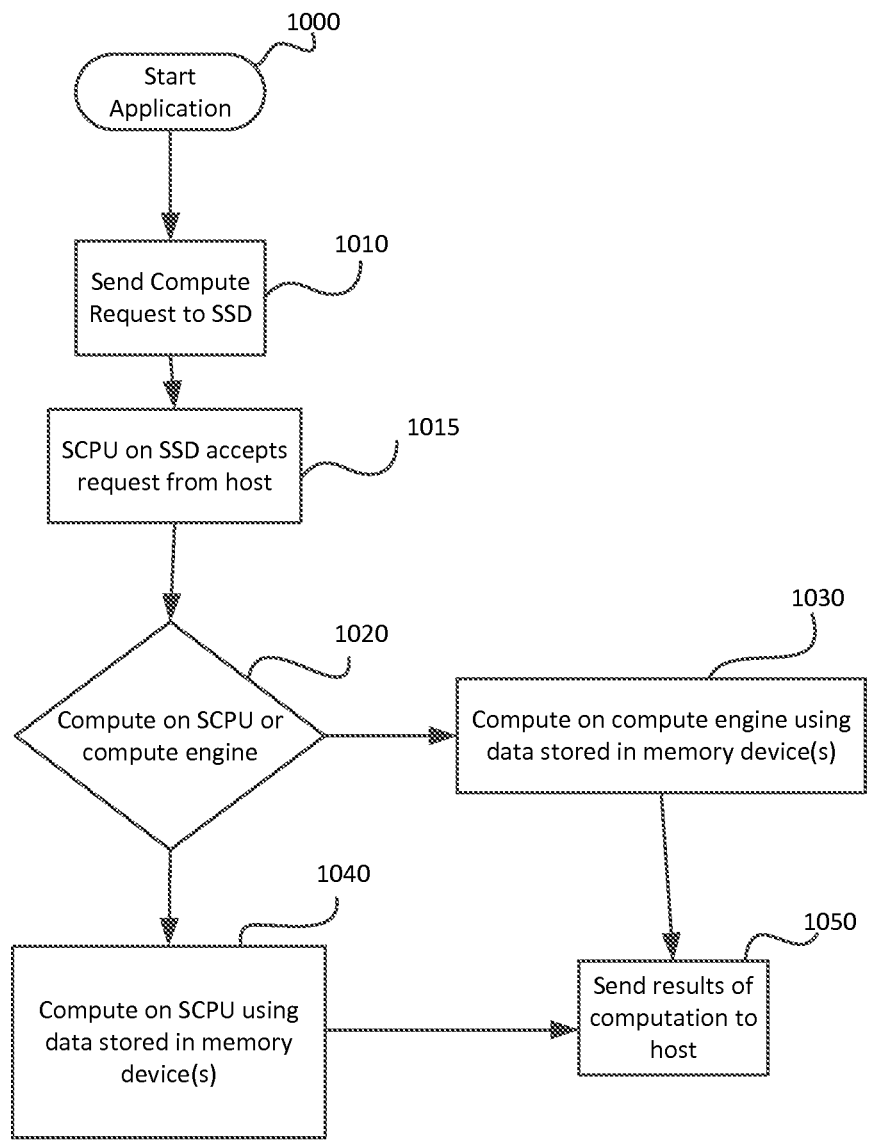
FIG. 2 shows an exemplary process performed by the storage subsystem of FIG. 1.

FIG. 2 shows an exemplary process performed by the storage subsystem 2001 of FIG. 1. At 1000, in FIG. 2, an application, requiring data computation, is begun by the host. The host determines if the data computation can be offloaded to the SSD. If the data computation can be offloaded, the host will send the compute request to the SSD at step 1010. This can be accomplished by invoking appropriate Application Programming Interface (API) that is used to communicate with the SSD. The API could describe the compute function and the data that is to be operated upon that resides in the SSD. Next, at step 1015, the SCPU 2010 accepts a request from the host through the host interface 2080. Next, at 1020, a determination is made by the SCPU 2010 as to whether the SCPU 2010 or the compute engine 2095 perform the computation. If the computation is determined to be performed by the compute engine 2095, the process proceeds to the step 1030. At the step 1030, the SCPU 2010 directs data movement from the memory devices 2090 or 2100, through the memory controllers 2070 or 2060N, to the compute engine 2095. The computation is performed by the compute engine 2095 using the data that is stored in the memory devices 2090 or 2100. Next, at step 1050, results of the computation by the compute engine 2095 are sent to the host through the SCPU 2010 and the host interface 2080. Otherwise, if at 1020, it is determined that the SCPU 2010 is to perform the computation, the process continues to the step 1040 where the SCPU 2010 directs data movement from the memory devices 2090 or 2100, through the memory controllers 2070 or 2060N to the memory 2001 and performs the computation using the data stored in the memory devices 2090 or 2100 and step 1050 is consummated.

In this respect, the storage subsystem 2001 allows performing computation within a SSD, avoiding data movement of data that is stored in the SSD to the host for computation, performing the compute function in the compute engine 2095 or the SCPU 2010, and reducing latency of applications because data is not moved from memory devices 2090 or 2100 across many interfaces to the host.

Although the description has been described with respect to particular embodiments thereof, these particular embodiments are merely illustrative, and not restrictive.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What we claim is:

1. A solid state disk (SSD) comprising:
   a storage central processing unit (SCPU) operable to receive from and send commands to a host, located externally to the SSD, the SCPU responsive to a command requiring searching of data;
   a single compute engine coupled to the SCPU; and
   a bank of memory devices coupled to the SCPU and the single compute engine, through an interface, the bank of memory devices configured to store data associated with the command, the single compute engine being separated from the stored data in the bank of memory devices only by the interface, the single compute engine operable to search the stored data entirely within the SSD by exploiting the close locality of the data being searched before the transformed data is sent to the host and to avoid the need for any data movement to and from the host during the search.

2. The solid state disk (SSD), as recited in claim 1, further including a memory coupled to the SCPU configured to store the data received from the host when the single compute engine is to perform the search.

3. The solid state disk (SSD), as recited in claim 1, further including a host interface coupled to the SCPU and operable to receive from and send commands to the host.

4. The solid state disk (SSD), as recited in claim 3, wherein the SSD is operable to avoid moving additional data received from the host, by the host interface, to the bank of memory devices during the transformation thereby reducing power consumption.

5. The solid state disk (SSD), as recited in claim 1, wherein the memory devices of the bank of memory devices are non-volatile memory.

6. The solid state disk (SSD), as recited in claim 1, wherein the memory devices of the bank of memory devices are volatile memory.

7. The solid state disk (SSD), as recited in claim 1, further including a memory controller coupled to the bank of memory devices and operable to control the bank of memory devices.

8. The SSD, as recited in claim 7, wherein the interface is a PCI Express (PCIe) bus or a processor interconnect bus.

9. The solid state disk (SSD), as recited in claim 1, wherein the SSD causes reduced latency by avoiding movement of the data across multiple interfaces.

10. The SSD, as recited in claim 1, wherein the SSD is a server.

11. The SSD, as recited in claim 1, wherein the host interface is coupled to the host through a host interface bus.

12. The SSD, as recited in claim 11, wherein the host interface bus is PCI Express (PCIe), Ethernet, fiber channel, infiniband, or Serial ATA (SATA).

13. A solid state disk (SSD) comprising:
   a storage central processing unit (SCPU) operable to receive from and send events to a host, located externally to the SSD, the SCPU responsive to an event requiring data transformation;
   a single compute engine coupled to the SCPU; and
   a bank of memory devices coupled to the SCPU and the single compute engine, through an interface, the bank of memory devices configured to store data associated with the event, the single compute engine being separated from the stored data in the bank of memory devices only by the interface, the single compute engine operable to search the stored data entirely within the SSD by exploiting the close locality of the data being transformed before the transformed data is sent to the host, in response to the command, and to avoid the need for data movement to and from the host during the transformation.

14. The SSD, as recited in claim 13, wherein the SCPU is operable to determine whether the SCPU or the single compute engine perform the search of the data.

15. The SSD, as recited in claim 13, further including a memory coupled to the SCPU configured to store the data when the SCPU or the single compute engine is to search the data.

16. The SSD, as recited in claim 13, wherein the host interface is coupled to the host through a host interface bus.

17. The SSD, as recited in claim 16, wherein the host interface bus is PCI Express (PCIe), Ethernet, fiber channel, infiniband, or Serial ATA (SATA).

18. The SSD, as recited in claim 13, wherein the memory devices of the bank of memory devices are non-volatile memory.

19. The SSD, as recited in claim 13, wherein the memory devices of the bank of memory devices are volatile memory.

20. The SSD, as recited in claim 13, wherein the storage subsystem is a solid storage disk.

21. The SSD, as recited in claim 13, wherein the storage subsystem is a server.

22. A method of managing data in a solid state disk (SSD) comprising:
    receiving a command and accompanying data from a host through an interface, the host being located externally to the SSD, by a storage central processing unit (SCPU), the command requiring transformation of the data;
    storing the data to be transformed in a bank of memory devices coupled to the SCPU;
    determining a single compute engine, coupled to the SCPU and the bank of memory devices, is to perform transformation of the data, the single compute engine being separated from the stored data in the bank of memory devices only by the interface; and
    upon the determination, the single compute engine being operable to search the stored data entirely within the SSD by exploiting the close locality of the data being search to the single compute engine, before the transformed data is sent to the host and to avoid the need for data movement to and from the host during the search.

23. The method of managing data, as recited in claim 22, further including moving the data from the bank of memory devices to a memory coupled to the SCPU when the SCPU is to search the data.

24. A solid state disk (SSD) comprising:
    a storage central processing unit (SCPU) operable to receive from and send events to a host, located externally to the SSD, the SCPU responsive to an event requiring data fast fourier transformation;
    a single compute engine coupled to the SCPU; and
    a bank of memory devices coupled to the SCPU and the single compute engine, through an interface, the bank of memory devices configured to store data associated with the event, the single compute engine being separated from the stored data in the bank of memory devices only by the interface, the single compute engine operable to perform fast fourier transformation on the stored data entirely within the SSD by exploiting the close locality of the data being transformed before the transformed data is sent to the host, in response to the command, and to avoid the need for data movement to and from the host during the transformation.

25. A solid state disk (SSD) comprising:
    a storage central processing unit (SCPU) operable to receive from and send commands to a host located externally to the SSD, the SCPU responsive to a command requiring a search for data;
    a single compute engine coupled to the SCPU; and
    a bank of memory devices coupled to the SCPU and the single compute engine and configured to store the data, the single compute engine being separated from the bank of memory devices only through an interface, the SCPU operable to search for the data entirely within the SSD, before a result of the search is sent to the host such as to avoid the need for any data movement to and from the host during the search.

26. A solid state disk (SSD) comprising:
    a storage central processing unit (SCPU) operable to receive from and send commands to a host, located externally to the SSD, the SCPU responsive to a command requiring data transformation;
    a single compute engine coupled to the SCPU; and
    a bank of memory devices coupled to the SCPU and the single compute engine, through an interface, the bank of memory devices configured to store data associated with the command, the single compute engine being separated from the stored data in the bank of memory devices only by the interface, the single compute engine operable to transform the stored data entirely within the SSD by exploiting the close locality of the data being transformed before the transformed data is sent to the host and to avoid the need for any data movement to and from the host during the transformation, wherein the SCPU is operable to determine whether the SCPU or the single compute engine perform the transformation of the data.

27. The solid state disk (SSD), as recited in claim 26, further including a memory coupled to the SCPU configured to store the data received from the host when the single compute engine is to perform the transformation.

28. The solid state disk (SSD), as recited in claim 26, further including a host interface coupled to the SCPU and operable to receive from and send commands to the host.

29. The solid state disk (SSD), as recited in claim 28, wherein the SSD is operable to avoid moving additional data received from the host, by the host interface, to the bank of memory devices during the transformation thereby reducing power consumption.

30. The solid state disk (SSD), as recited in claim 26, wherein the memory devices of the bank of memory devices are non-volatile memory.

31. The solid state disk (SSD), as recited in claim 26, wherein the memory devices of the bank of memory devices are volatile memory.

32. The solid state disk (SSD), as recited in claim 26, further including a memory controller being coupled to the bank of memory devices and operable to control the bank of memory devices.

33. The solid state disk (SSD), as recited in claim 26, wherein the SSD causes reduced latency by avoiding movement of the data across multiple interfaces.

34. The SSD, as recited in claim 26, wherein the transformation is fast fourier transform (FFT).

35. The SSD, as recited in claim 26, wherein the SSD is a server.

36. The SSD, as recited in claim 26, wherein the interface is a PCI Express (PCIe) bus or a processor interconnect bus.

37. The SSD, as recited in claim 26, wherein the host interface is coupled to the host through a host interface bus.

38. The SSD, as recited in claim 37, wherein the host interface bus is PCI Express (PCIe), Ethernet, fiber channel, infiniband, or Serial ATA (SATA).

39. The SSD, as recited in claim 26, wherein the memory devices of the bank of memory devices are non-volatile memory.

40. The SSD, as recited in claim 26, wherein the memory devices of the bank of memory devices are volatile memory.

41. The SSD, as recited in claim 26, wherein the storage subsystem is a solid storage disk.

42. The SSD, as recited in claim 26, wherein the transformation is fast fourier transform (FFT).

43. The SSD, as recited in claim 26, wherein the storage subsystem is a server.

44. The SSD, as recited in claim 26, wherein transforming the data is searching the data.

45. A solid state disk (SSD) comprising:
a storage central processing unit (SCPU) operable to receive from and send events to a host, located externally to the SSD, the SCPU responsive to an event requiring data transformation;
a single compute engine coupled to the SCPU; and
a bank of memory devices coupled to the SCPU and the compute engine, through an interface, the bank of memory devices configured to store data associated with the event, the single compute engine being separated from the stored data in the bank of memory devices only by the interface, the single compute engine operable to transform the stored data entirely within the SSD by exploiting the close locality of the data being transformed before the transformed data is sent to the host, in response to the command, and to avoid the need for data movement to and from the host during the transformation,
wherein the SCPU is operable to determine whether the SCPU or the single compute engine perform the transformation of the data.

46. The SSD, as recited in claim 45, wherein the SCPU is operable to determine whether the SCPU or the single compute engine perform the transformation of the data.

47. The SSD, as recited in claim 46, further including a memory coupled to the SCPU configured to store the data when the SCPU or the single compute engine is to transform the data.

48. The SSD, as recited in claim 45 wherein the host interface is coupled to the host through a host interface bus.

49. The SSD, as recited in claim 48, wherein the host interface bus is PCI Express (PCIe), Ethernet, fiber channel, infiniband, or Serial ATA (SATA).

50. A method of managing data in a solid state disk (SSD) comprising:
receiving a command and accompanying data from a host through an interface, the host being located externally to the SSD, by a storage central processing unit (SCPU), the command requiring transformation of the data;
storing the data to be transformed in a bank of memory devices coupled to the SCPU;
determining a single compute engine, coupled to the SCPU and the bank of memory devices, is to perform transformation of the data, the single compute engine being separated from the stored data in the bank of memory devices only by the interface; and
upon the determination, the single compute engine being operable to perform transformation of the stored data entirely within the SSD by exploiting the close locality of the data being transformed to the single compute engine, before the transformed data is sent to the host and to avoid the need for data movement to and from the host during the transformation,
wherein the SCPU is operable to determine whether the SCPU or the single compute engine perform the transformation of the data.

51. The method of managing data, as recited in claim 50, further including moving the data from the bank of memory devices to a memory coupled to the SCPU when the SCPU is to perform transformation of the data.

52. The method of managing data, as recited in claim 50, wherein the transformation of the data is searching of the data.

53. A solid state disk (SSD) comprising:
a storage central processing unit (SCPU) operable to receive from and send commands to a host located externally to the SSD, the SCPU responsive to a command requiring a search for data;
a single compute engine coupled to the SCPU; and
a bank of memory devices coupled to the SCPU and the single compute engine and configured to store the data, the single compute engine being separated from the bank of memory devices only through an interface, the SCPU operable to search for the data entirely within the SSD, before a result of the search is sent to the host such as to avoid the need for any data movement to and from the host during the search,
wherein the SCPU is operable to determine whether the SCPU or the single compute engine perform the transformation of the data.

54. The SSD, as recited in claim 53, wherein transforming the data is searching the data.

\* \* \* \* \*